United States Patent [19]

Paquette

[11] 4,268,391
[45] May 19, 1981

[54] LEAK PROOF FILTER PLATE SYSTEM FOR SLIDE PLATE FILTERS

[75] Inventor: James P. Paquette, Uxbridge, Mass.

[73] Assignee: The Berlyn Corporation, Worcester, Mass.

[21] Appl. No.: 98,061

[22] Filed: Nov. 28, 1979

[51] Int. Cl.³ .............................................. B01D 25/12
[52] U.S. Cl. ........................... 210/236; 210/DIG. 15; 210/329; 210/445; 210/447
[58] Field of Search ................. 210/65, 236, 329, 359, 210/445, 447; 425/135, 197

[56] References Cited

U.S. PATENT DOCUMENTS

| | | | |
|---|---|---|---|
| 3,804,758 | 4/1974 | Cooper et al. ........................ | 210/65 |
| 3,856,277 | 12/1974 | Tiramani ............................. | 425/197 |
| 4,059,525 | 11/1977 | Krasnow ............................. | 210/236 |
| 4,082,487 | 4/1978 | Rapp .................................. | 425/135 |

Primary Examiner—Theodore A. Granger
Attorney, Agent, or Firm—Wolf, Greenfield & Sacks

[57] ABSTRACT

A slide-plate filter apparatus particularly for plastic stock under pressure in which rigid filter plate sections carrying corresponding sections of filter media are fed in a continuing sequence across the flow path of the plastic stock is provided with off-set retainer plates for directing plastic stock which is forced between the filter plate sections into a path which includes filter media, so that no unfiltered plastic stock can pass through the apparatus.

6 Claims, 6 Drawing Figures

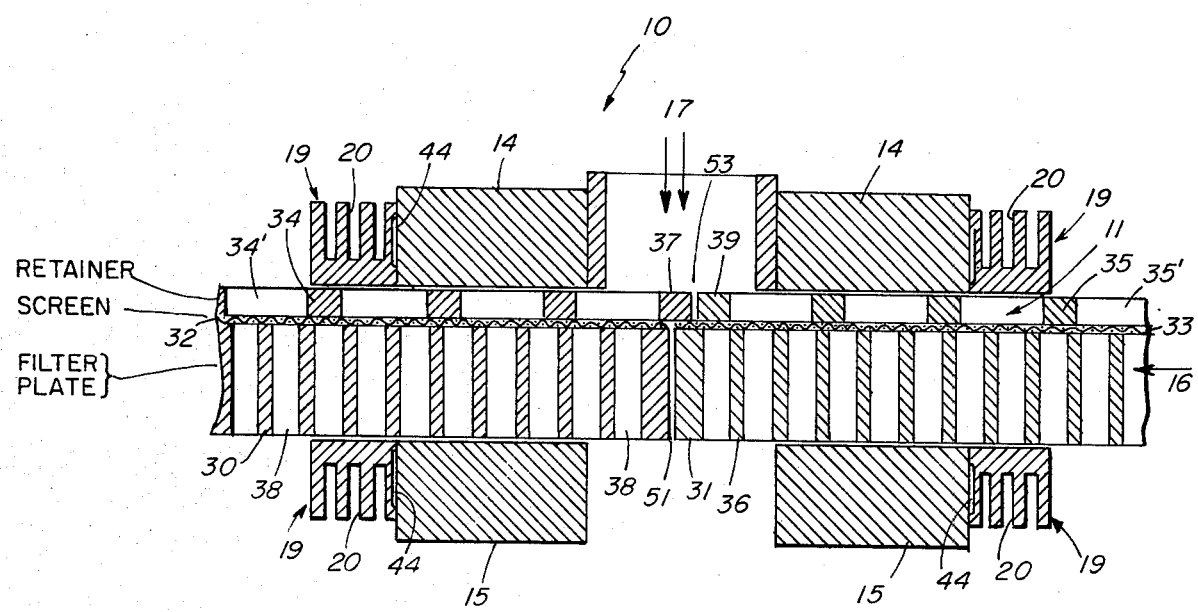
FIG. 1
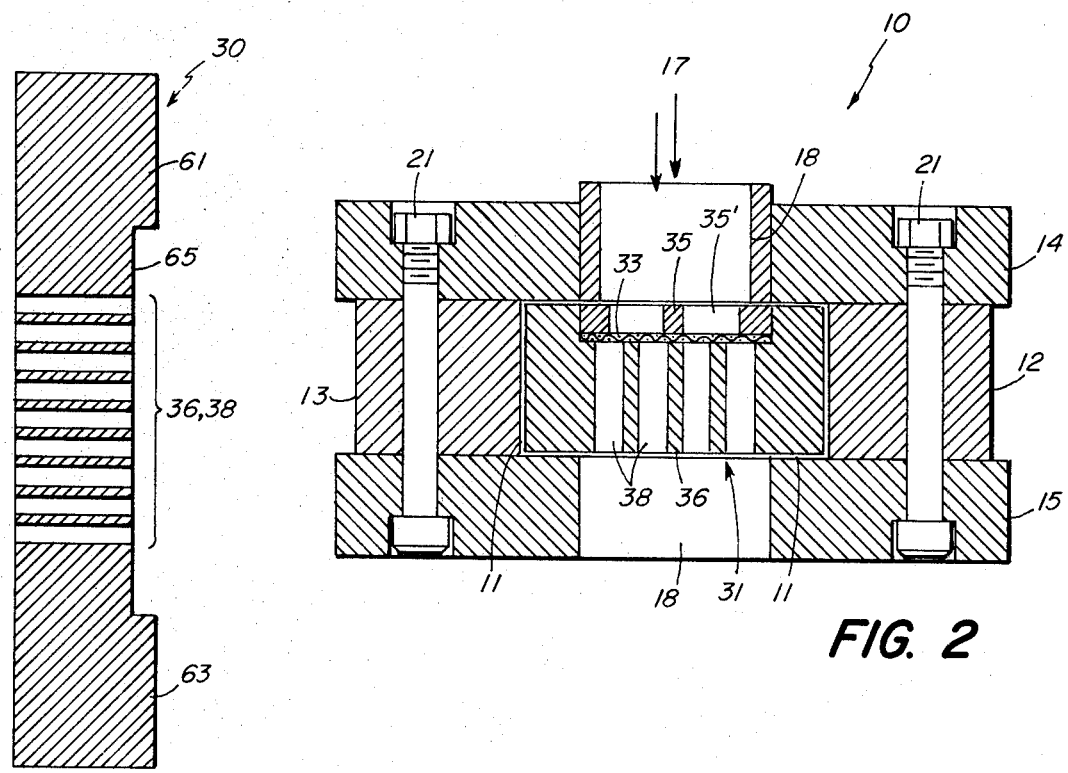
FIG. 4
FIG. 2

LEAK PROOF FILTER PLATE SYSTEM FOR SLIDE PLATE FILTERS

BACKGROUND OF THE INVENTION

In the manufacture of articles from rubbery, viscoelastic and thermoplastic working materials (e.g.: polymers, and certain thermosetting resins, vulcanizable materials and polymerzable monomers) all of which are sometimes called plastic stock, it is common practice to filter the working materials. This may be done, for example, in a reclaiming process, to prepare re-claimed materials for use in a product; it may also be done, for example, in an extrusion apparatus, to make certain that no foreign matter will be introduced into an extrusion die.

An extrusion process is a continuous process in which the quality and quantity of the extrudate are proportional to the stability and consistency of the melt. A change in operating conditions changes the quality or quantity or both of the end product, and some of the conditions which can change are affected by conventional filtering operations. The practice of filtering the working material in an extrusion process requires the positioning of a filter medium across the path of material flow resulting in a pressure drop. The size of the pressure drop is related to the difficulty with which working material passes through the filter medium. When the filter medium is clean the pressure drop across the medium is low as compared to the pressure drop which exists when the filter medium is clogged with collected contaminants. For example, a 1500 psi drop is typical for a clean filter, whereas a pressure drop of 4000 psi is typical for a clogged filter medium.

It is desirable to have a constant and preferably low pressure drop across the filter medium for reasons relating to the quality and quantity of the working material. When the pressure drop across the filter medium increases, the shear on the working material increases, which in turn increases the temperature of the working material. The temperature of the working material is a basic operating parameter which determines a particular quality of the material. In addition, an increase in pressure drop across the filter medium reduces the rate of production of the entire line as well as requiring additional extruder pump horsepower to overcome the rising back pressure. Of course, an increase in cost also results.

THE PRIOR ART

A rigid slide plate filter, not unlike filters in use today, is shown in U.S. Pat. No. 642,814 issued to Cowen in 1900. It has two filters on one slide plate, and when one of the filters becomes clogged the slide plate is moved to remove the first filter entirely and replace it with the second filter, bringing about an immediate dramatic change in operating pressure. Other forms of rigid slide plate filter like Cowen's are shown in Garrahan's U.S. Pat. No. 1,195,576; Voight U.S. Pat. No. 3,684,419; Paquette U.S. Pat. No. 3,797,655; Cooper et al U.S. Pat. No. 3,804,758; and Heston U.S. Pat. No. 3,983,038.

It is common practice to use slide plate filters in a process where the working material is highly pressurized, sometimes as high as 10,000 pounds per square inch or more. There is, therefore, a need to seal the slide filter apparatus against leakage of working material from the melt stream along surfaces of the slide plate. On the other hand, there is a need to move the filter medium across the melt stream at such a rate that a low, substantially constant pressure drop is achieved. Filters that are usable at such high operating pressures with sealing means that can be maintained continuously at the inlet port passageway and at the outlet port passageway while permitting the screen plate means carrying filter media to be moved continuously across the melt stream are described and claimed in a copending application of the present inventor and another Ser. No. 962,116 filed Nov. 20, 1978.

In filters of the type described in the copending application, a rigid self-supporting filter plate carries filter media across the melt stream from an inlet port passageway to an outlet port passageway. Typical practice in such filters is to use sections of filter plates in succession, one section following the other in a continuing progression across the path of the working material (i.e.: the "melt stream").

The present invention relates to such slide plate filters in which each filter plate section carries on its upstream surface an individual section of filter screen or screens, and the sections of filter plate abut each other as they are progressed across the melt stream. In this arrangement, as the abutting ends of two successive filter plate sections are moved across the melt stream, the joint between them presents a possibility that some of the working material can leak, unfiltered, between them. Typically when the filter plates in a continuous filter of the type described are joined together a gap of 0.002 to 0.007 inches exists between the plates. In most filtration applications any unfiltered working material which can squeeze through this gap does not preoent a problem; however, in some applications it may give rise to a result that is not desirable. The gap and any consequent leakage may be reduced by carefully machining the ends of adjacent plates, at the sacrifice of interchangeability and at significant extra cost.

GENERAL NATURE OF THE INVENTION

The present invention provides new structural means to convert the gap between successive filter plate sections into a filtration zone, so that any working material leaking through that gap will first be forced to pass through a portion of the filter screen or screens carried on one of the abutting filter plate sections. In a preferred embodiment of the invention, each filter plate section is fitted with a retainer frame for the screen or screens carried by that section, and each retainer frame is off-set on its filter plate section so that is overlaps one end of the filter plate section and falls short of the other end. When two successive plates are butted together, the gap formed between the retainer frames is offset from the gap between the plates. The overlapping end of the frame on one filter plate section overlies the portion of the filter screen(s) on the abutting filter plate section which is not covered by the short-fall end of the frame on the abutting plate, so that the offset gap between adjacent frame ends overlies that portion of the filter screen or screens. As a result, any working material that leaks into the gap between the filter plate sections must first have passed through a corresponding but offset gap between the retainer frames and a portion of the filter screen or screens carried by those sections.

BRIEF DESCRIPTION OF THE DRAWINGS

FIG. 1 is a sectional view of a screen filter according to the invention;

FIG. 2 is a section on line 2—2 of a filter as shown in FIG. 1;

FIG. 4 is a cross-section on line 4—4 of FIG. 3;

DETAILED DESCRIPTION OF THE DRAWINGS

Figure 3:
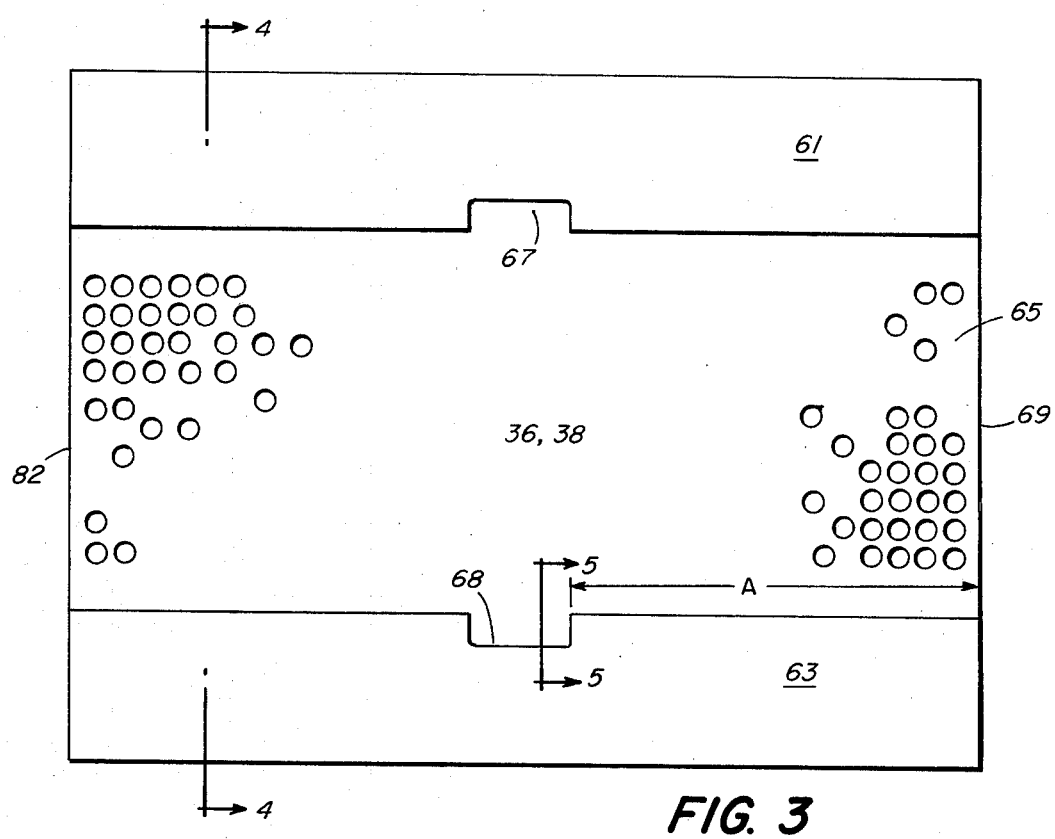
FIG. 3 is a plan view of a filter plate section.

The filter 10 that is shown in FIGS. 1 and 2 has a main body comprised essentially of a front body member 14 and a rear body member 15 defining a flow passage 18 through which melted plastic stock can flow in the direction indicated by the arrows 17. A pair of rails 12 and 13 are held between the front and rear main body members 14 and 15, respectively, by bolts 31. These rails together with the body members define a transverse passage 11 through which the filter plates and filter media are moved across the flow passage in the direction indicated generally by the arrow 16 in FIG. 1. Heat exchangers 19 are fitted to the main body members 14 and 15 at both ends of the transverse passage 11 for use in forming seals of plastic stock at the inlet and outlet ends of the transverse passage 11. Fins 20 are provided on the heat exchangers, if they are intended to exchange heat with the ambient air. Gaps 44 are provided between the heat exchangers thermally from the main body of the filter. Alternatively, mechanical seals may be used, as is taught in U.S. Pat. No. 4,059,525.

The active filter mechanism comprises a series of filter plate sections 30, 31 abutted end to end in the transverse passage 11. Each filter plate section carries a section of filter screen media 32, 33, respectively, on a surface facing the oncoming plastic stock flowing in the flow passage 18. The filter screen sections are of the same dimensions as the plan view of the respective filter plates on which they are carried. A retainer plate 34, 35 overlies each filter screen section, respectively, on each of the filter plate sections 30, 31. The filter plates each having bores 38 through them separated by filter plate material 36, for supporting the filter screen media against the pressure of the oncoming plastic stock, while allowing the filtered plastic stock to pass through the filter plate. The retainer plates have larger openings 34', 35', respectively, for giving ready access to the filter screen media. As is seen in FIG. 6, the openings in the retainer plates are preferably square in plan so as to maximize the access provided to the filter screen media.

Referring particularly to FIG. 1, the gap 51 between confronting ends of two sequential filter plate sections 30, 31, is blocked by an end 37 of one of the retainer plates 34 which is off-set from its underlying filter plate section 30. In a similar manner, the next-following retainer plate 35 is off-set from its underlying filter plate section 31 so that its confronting end 39 forms with the adjoining end 37 of the next-preceding retainer plate 34 a second gap 53 which is off-set from the underlying gap 51 between the two filter plate sections 30, 31. This second gap 53 also overlies a portion of the filter screen media 33 that is carried on a second filter plate section 31. As a result, plastic stock which escapes into the gap 53 between the retainer plates must pass through filter screen media, constituted by a portion of the filter screen media section 33, before entering the underlying gap 51 between the filter plate sections. In this manner the invention provides that filter screen media will be present in the path through the gap between the filter plates, and no plastic stock can pass through the apparatus 10 without being filtered.

Figure 5:
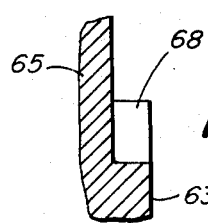
FIG. 5 is a partial section taken on line 5—5 of FIG. 3.

A representative filter plate section 30 is illustrated in FIGS. 3, 4 and 5. A rigid body comprised of side rails 61, 63, and between them an operative filter-plate portion 65 which includes the bores 38 and intervening support members 36. A notch 67, 68, is provided in each of the rails 61, 63, respectively, facing inwardly toward the operative filter plate portion 65. A representative section of one notch 68 is shown in FIG. 5. These notches are located a specific distance, for example, the dimension A, from one of the edges, in FIG. 3 the right hand edge 69, for the purpose of locating the overlying retainer plate relative to both edges of the filter plate section.

Figure 6:
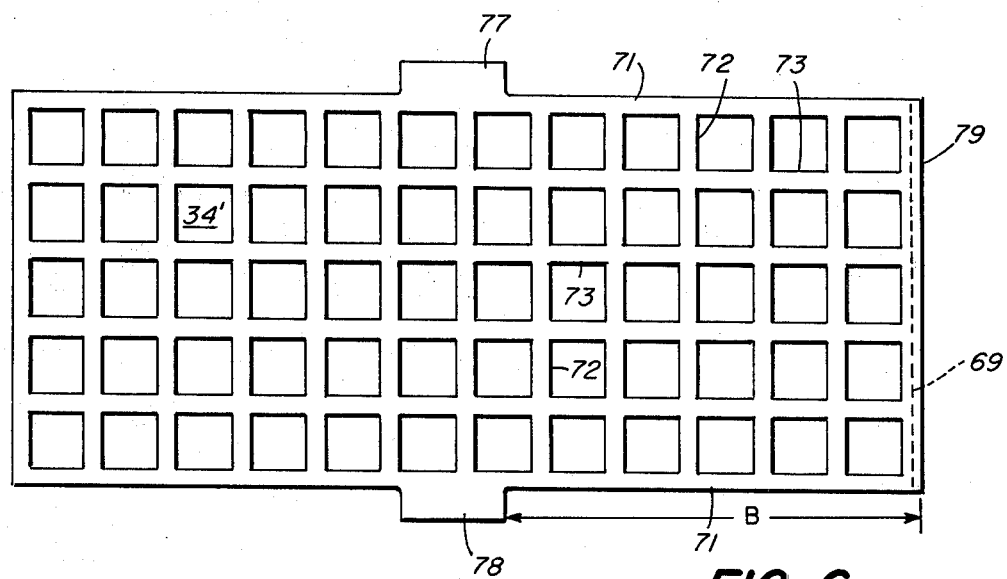
FIG. 6 is a plan view of a retainer frame.

The retainer plate 34 which overlies the first filter plate 30 is shown in plan in FIG. 6, comprising essentially a frame 71 which outlines the plate and has cross members 72, 73 which define the square openings 34'. Each of the long sides of the frame is fitted with a key 77, 78, for interlocking with the notches 67, 68, respectively, on the filter plate rails 61, 63, respectively. The keys are located a dimension, such as the dimension B as shown in FIG. 6, from one of the ends 79 of the retainer plate such that when the keys are fitted into the notches the end 79 of the retainer plate will overlie the end 69 of the filter plate section in the manner shown in FIG. 1. Simultaneously, the remaining end 81 of the retainer plate will fall short of the opposite end 82 of the filter plate. In this manner, each retainer plate is locked into an off-set position on its underlying filter plate section so that when the filter plate sections bearing retainer plates are fed end to end into the transverse passage 11, the gaps between filter plate sections will automatically become gaps which filter any plastic stock that escapes through them.

The rails 61, 63 extend above the surface of the operative portion 65 on which the filter screen is supported, so that when the retainer plate (34 on filter plate section 30, for example) is present the outer surface of the retainer plate may be substantially flush with the top surfaces of the rails.

The portion of filter media underlying the gap 53 between the ends 37, 39 of the respective retainer plates rests on a solid end portion of the second filter plate section 31. Plastic stock escaping through this gap is deflected to one side or the other (as seen in FIG. 1) over this solid end portion, into the underlying gap 51, or into one or more of the nearby bores 38, in the second filter plate 31.

I claim:

1. In slide filter apparatus for filtering contaminants from a fluid working material flowing in a defined path, the apparatus having rigid filter plate means for carrying on an up-stream surface replaceable filter media means from an inlet port passageway across the path of fluid flow to an outlet port passageway, said filter plate means being in sections which are butted end to end in a continuing progression across said path, each said section carrying a separate portion of said filter media, the space between each pair of abutting sections forming a gap into which fluid working material can escape from said path, the improvement comprising open frame means overlying said separate portion of filter media on said up-stream surface of each of said sections, each said frame means being off-set end-wise on the underlying filter plate section so as to form between abutting frame ends a second gap which is off-set from the gap between the underlying abutting filter plate sections, said second gap overlying a portion of the filter media carried by one of said underlying filter plate sections, whereby a path through said gaps contains said portion of filter media.

2. Apparatus according to claim 1 in which each said filter plate section is provided with first locating means for the overlying frame means, and each said overlying frame means is provided with second locating means that is registrable with the first locating means on the underlying filter plate section for establishing the dimensions of said end-wise off-set.

3. Apparatus according to claim 2 in which each said filter plate section has a pair of upstanding side rails between which the overlying frame means fits, and in which said first locating means are notches in the inner side edges of said rails, and said second locating means are projections extending laterally from the side edges of said frame means for engaging in said notches.

4. Apparatus according to claim 3 in which each said filter plate section has an operative portion between said rails in which bores are formed for passing filtrate and on which screen media are supported, said rails extending above the surface of said operative portion so that said screen media and said overlying frame means when present will present an outer surface that is substantially flush with the top surfaces of said rails.

5. Apparatus according to claim 4 in which said frame means is substantially rigid and comprised of open frames defining a plurality of rectangular openings that are substantially larger than said bores.

6. Apparatus according to claim 1 in which said portion of filter media underlying said second gap rests on a solid edge portion of said underlying filter plate section.

* * * * *